W. C. MARSH.
FRICTION BRAKE AND CLUTCH.
APPLICATION FILED FEB. 11, 1908.

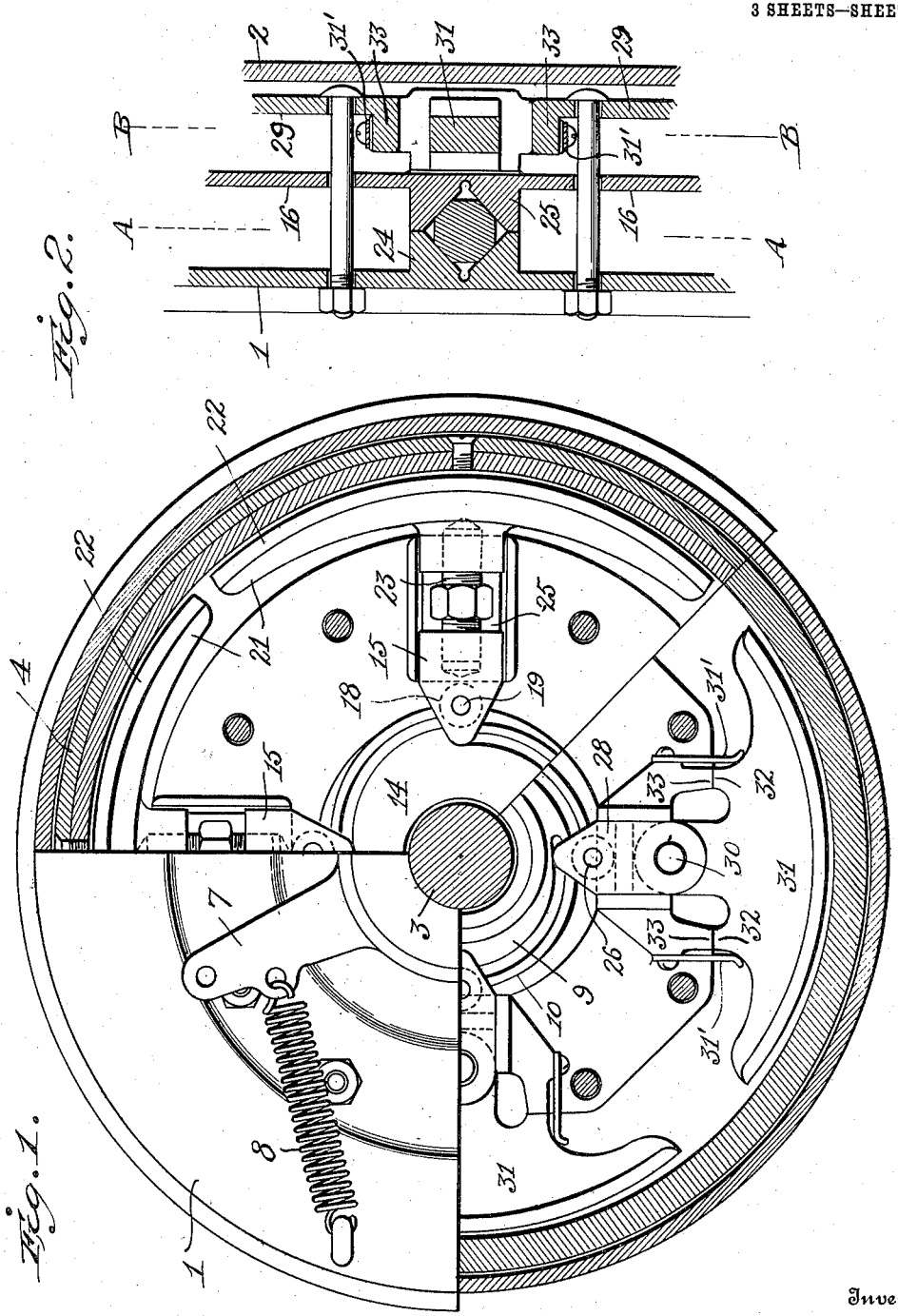

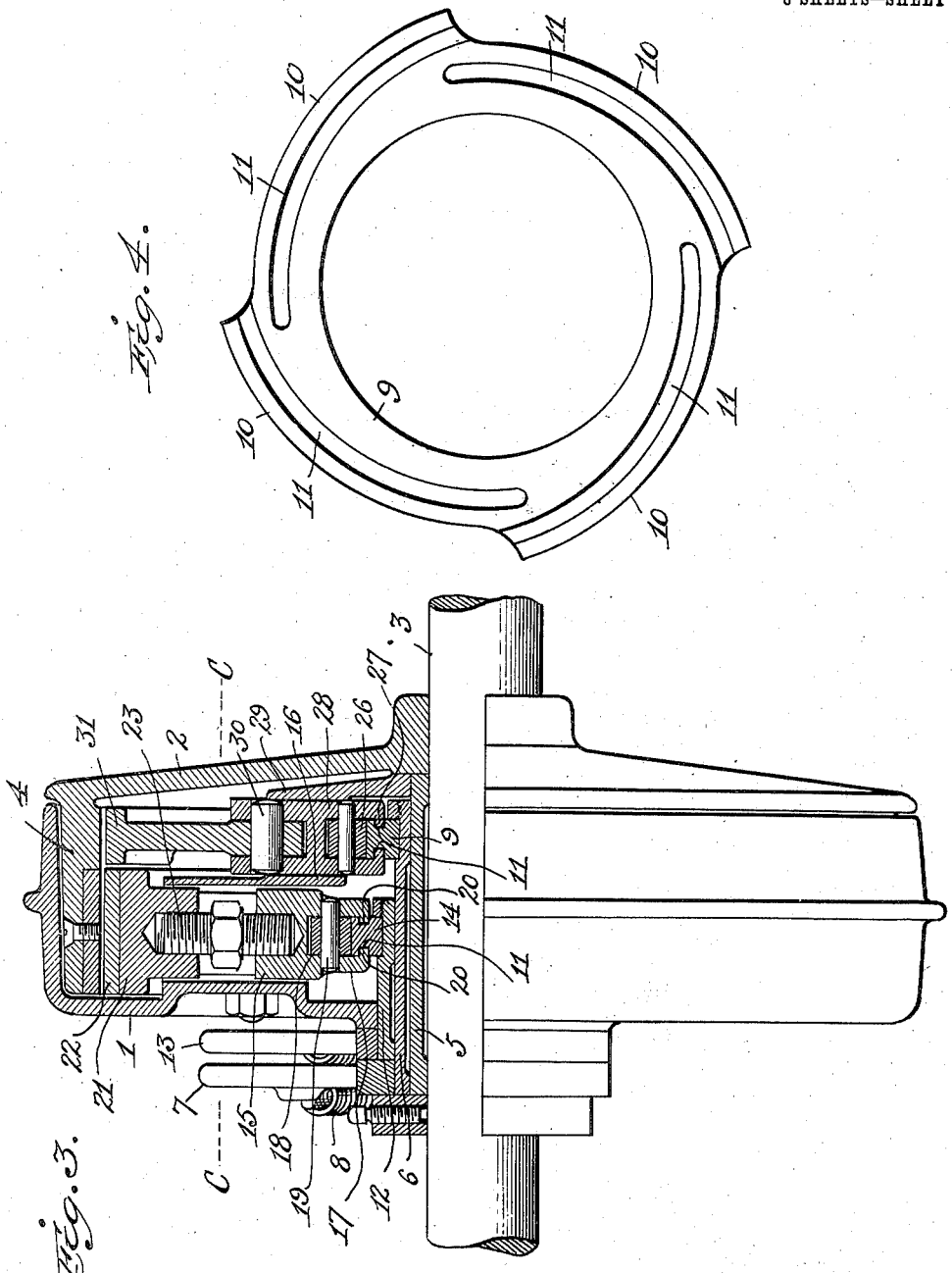

947,683.

Patented Jan. 25, 1910.
3 SHEETS—SHEET 3.

Witnesses
Edwin L. Jewell
Edwin F. Frey

Inventor
William C. Marsh
by Percy B. Hills
Attorney

UNITED STATES PATENT OFFICE.

WILLIAM C. MARSH, OF DUNKIRK, NEW YORK.

FRICTION BRAKE AND CLUTCH.

947,683.  Specification of Letters Patent.  Patented Jan. 25, 1910.

Application filed February 11, 1908. Serial No. 415,429.

*To all whom it may concern:*

Be it known that I, WILLIAM C. MARSH, a citizen of the United States, residing at Dunkirk, in the county of Chautauqua, State of New York, have invented new and useful Improvements in Friction Brakes and Clutches, of which the following is a specification.

Figure 5:
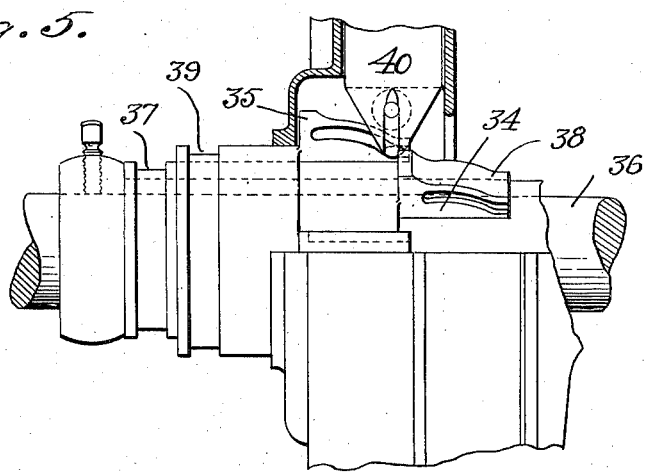
Figure 6:
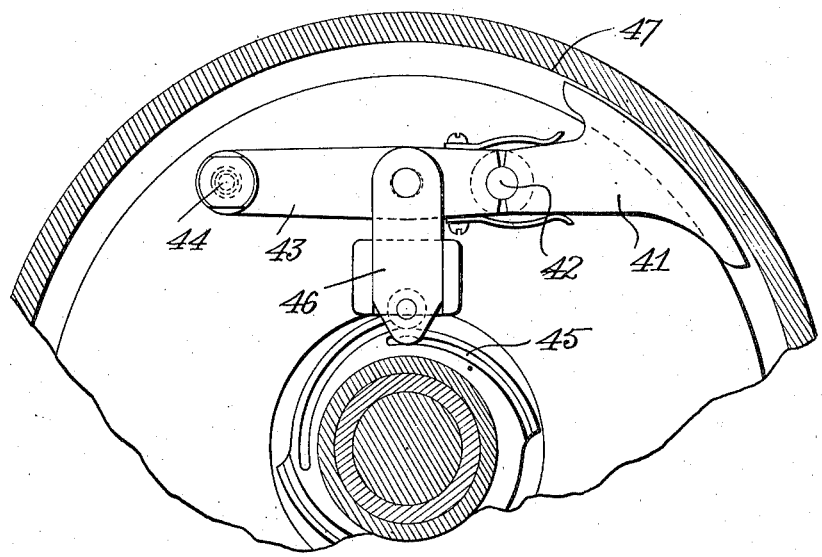

My invention relates to friction brakes and clutches, and has for its objects, first, to provide an improved mechanism for applying the brake or clutch shoes, and, secondly, an improved means for causing the brake or clutch shoes to grip more firmly after being applied, and to resume their normal inactive positions when released. These objects I accomplish in the manner and by the means hereinafter described and claimed, reference being had to the accompanying drawings, in which:

Figure 1 is a view partly in side elevation, partly in section on the line A—A, Fig. 2, and partly in section on the line B—B, Fig. 2. Fig. 2 is a sectional view taken on the line C—C, Fig. 3. Fig. 3 is a view partly in elevation and partly in central vertical transverse section. Fig. 4 is an enlarged detail elevation of one of the cam rings. Fig. 5 is a view partly in side elevation and partly in section of a modified construction adapted more particularly for use as a clutch for heavy machinery. Fig. 6 is a partial transverse sectional view illustrating still another modified construction, the emergency brake mechanism alone being employed.

Similar numerals of reference denote corresponding parts in the several views.

In the said drawings, which illustrate my improved construction used as a brake for automobiles, the reference numeral 1 denotes a fixed casing partly inclosing the rotating member 2 that is keyed to the shaft 3, or to the hub of the wheel, and whose flange 4 forms on its inner surface the contact surface for the brake shoes. Mounted on the shaft 3, or on a sleeve 5 on said shaft, is a sleeve 6 having fixed thereto a lever 7 by which it may be partially rotated against the tension of a spring 8 which normally retracts it, said sleeve 6 having fixed thereto a ring 9 formed with a series of cam surfaces 10 on its periphery, and with a corresponding series of grooves 11 in its opposite sides following the contour of said cam surfaces. A similar but shorter sleeve 12 is mounted on sleeve 6, and is provided with a lever 13 similar to lever 7 and with a cam ring 14 similar to cam ring 9.

A number of blocks 15 corresponding in number to the cam surfaces 10 are mounted to slide in the casing 1 between the same and a division plate 16, said blocks being each bifurcated at 17 at its inner end to receive a roller 18 mounted on a pintle 19 passing through said bifurcated arms 17, each of said rollers bearing against one of the cam surfaces 10 of ring 14. The ends of bifurcated arms 17 are inturned at 20 to engage in the grooves 11 in ring 14, as shown. Also lying between casing 1 and division plate 16 is a series of blocks 21 extended at their outer ends into brake shoes 22, and corresponding in number to that of blocks 15 to which they are adjustably connected by screw bolts 23 having oppositely pitched screw threads, as shown. As shown in Fig. 2, the casing 1 is projected inward at 24, and the plate 16 is similarly projected at 25 to embrace the head of the screw bolts 23 when in position to retain the latter against rotation.

Coöperating with the cam ring 9 through rollers 26 and inturned ends 27, in the same manner as do the blocks 15 with cam ring 14, is a corresponding series of blocks 28, lying between division plate 16 and a separating plate 29, each of said blocks having pivoted thereto at 30 the inner end of a brake shoe 31. Said brake shoes are extended for a distance laterally to each side, but with their outer faces struck from the arc of a circle slightly smaller in diameter than that of the inner braking surface of the flange 4, and are provided with abutments 32 contacting with similar abutments 33 on extensions of plate 29 acting to position said brake shoes centrally when retracted.

From the above description the operation of my improved construction will be understood as follows: When it is desired to apply a braking action gradually to shaft 3, the lever 13 is pulled against the tension of its spring corresponding to spring 8 (not shown), which will correspondingly rotate its sleeve 12 and cam ring 14, and through the engagement of cam faces 10 thereon with the rollers 18 of blocks 15 will gradually project outward said blocks and their brake shoe blocks into braking contact with the flange 4. Upon releasing the lever 13 the same will be retracted by its spring, thus returning the sleeve 12 and cam ring 14 to their normal positions, the latter through the engagement of the inturned ends 20 of blocks 15 with the cam grooves 11 positively retracting blocks 15 and their parts to their normal inactive positions. Should an emergency stop be desired, the lever 7 is operated, and the brake shoes 31 forced outward in a manner similar to brake shoes 22, through sleeve 6 and cam ring 9, the result being that as the braking surfaces of said brake shoes are formed on the arc of a circle of greater diameter than that of one struck from the pivotal points of said brake shoes, they will, when brought into contact with the flange 4, instantly jam or wedge thereagainst, thus providing a rapid and complete braking action. Upon releasing the lever 7 its spring in retracting the same, and through it the sleeve 6 and cam ring 9, will positively retract said brake shoes, thus bringing the abutments 32 and 33 into contact, which, in conjunction with springs 31', will force said brake shoes to their central position and will maintain them in said position.

In considering the operation of the brake shoes 31, it will be observed that said shoes and their blocks 28 move radially with respect to shaft 3, and that the action of cam ring 9 thereon is also radial, so that the only force necessary to apply said brake shoes is that sufficient to overcome their inertia, while the inward thrust caused by said brake shoes tilting into locking engagement with flange 4 will be exerted against the cam surfaces 10 of cam ring 9 at an angle of substantially 45 degrees to their line of movement, which will exert substantially no rotating strain on said cam ring 9, and will therefore require substantially no additional power to resist the same.

While I have described and illustrated my improved construction in Figs. 1 to 4 as applied to a brake, it will be understood that I contemplate using the same as a clutch, which may be gradually applied until locked through brake shoes 22, and then maintained locked against abnormal strains through the wedging action of brake shoes 31 as shown for instance in Fig. 5.

In Fig. 5 I have shown a somewhat modified construction, wherein I employ, instead of the rotating rings 9 and 14, the cams 34 and 35 carried respectively by sleeves 34' and 35', and movable longitudinally with respect to the shaft 36 to force the brake or clutch shoes into and out of action. In this construction the cam sleeve 35', which operates shoes (not shown) like shoes 21, through blocks 40, is first put into operation by moving said cam sleeve to the right through a shifting lever engaged with groove 39, which through the cam surfaces 38' on said cam sleeve forces outward said shoes in a manner similar to the operation of cam ring 14. The driven member of the clutch being put in motion by said shoes, the cam sleeve 34' may then be moved to the right, through a shifting lever engaged with groove 37 therein, which through cam surfaces 38 and blocks (not shown) similar to blocks 28 will put into operation shoes similar to shoes 31, whereby the driven member of the clutch will be locked to the driving member. It will be understood that by reason of the fact that the cams 34 and 35 are arranged in staggered relation with respect to each other, with the cams 35 resting on the sleeve 34' carrying cams 34, the sleeve 35' and its cams 35 are free to be moved to the right without disturbing cams 34. This construction is peculiarly applicable to clutches for comparatively heavy machinery.

In Fig. 6 I have illustrated still another modification of my novel construction wherein the emergency brake or clutch shoes alone are used. In this construction the shoe 41 is pivoted at 42 to a lever 43 pivoted at its other end at 44 in the casing, and operated by cam ring 45 through connecting block 46 in the manner similar to the operation of cam ring 9 and block 28. By this construction, the brake shoe 41, when forced against the surface 47, will operate when said surface is moving in one direction only, and will freely yield on its pivot 42 when said surface 47 is moving in the opposite direction. This construction is peculiarly adapted for use on automobiles as a safety brake in ascending hills, as the same may be so applied as to permit free movement ahead, but acting an instant and automatic check against movement backward. It will be understood that said construction is intended solely as a supplemental hill brake, and may be employed either in addition to the brake mechanism shown in Figs. 1 to 4, or with any other form of brake mechanism.

Having thus described my invention, what I claim as new and desire to secure by Letters Patent is:

1. A friction brake, embodying a member having a braking surface, a brake shoe, means for applying the same to the braking surface so as to gradually increase its braking action thereon, a second brake shoe, a movable block to which said second brake shoe is pivoted, said second brake shoe being adapted when applied to automatically lock of itself against the braking surface, and means for applying said second brake shoe.

2. A friction brake, embodying a member having a braking surface, a brake shoe, means for applying the same to the braking surface so as to gradually increase its braking action thereon, a second brake shoe, a radially movable block to which said second brake shoe is pivoted, said second brake shoe being adapted when applied to automatically lock of itself against the braking surface, and means for applying said second brake shoe.

3. A friction brake, embodying a member having a braking surface, a brake shoe, means for applying the same to the braking surface so as to gradually increase its braking action thereon, a second brake shoe, a movable block to which said second brake shoe is pivoted, said second brake shoe being adapted when applied to automatically lock of itself against the braking surface, and means for applying said second brake shoe, both of said applying means operating to move said brake shoes positively both toward and from the braking position.

4. A friction brake, embodying a brake shoe, a block connected to said brake shoe, a roller carried by said block, a movable part having a cam surface against which said roller contacts and having cam grooves, and lugs on said block engaging said cam grooves to retract said block and brake shoe.

5. A friction brake, embodying a brake shoe, a block connected to said brake shoe and having a bifurcated end and inturned lugs on said bifurcated end, a roller mounted in the bifurcated end of said block, a movable part having a cam surface against which said roller contacts and having cam grooves engaged by said inturned lugs, and means for shifting said movable part.

6. A friction brake, embodying a brake shoe, a second brake shoe, a movable base to which said second brake shoe is pivoted in such manner as to wedge against the braking surface when applied, a member having a common braking surface for said brake shoes, separate oscillatory cam rings for positively moving said brake shoes both toward and from the braking position, concentrically mounted sleeves carrying said cam rings, and levers for separately operating said sleeves.

7. In a friction brake, a shaft, a member having a curved braking surface in fixed relation to said shaft, a brake shoe having its contact surface formed on the arc of a circle of greater diameter than that of one struck from the pivotal point of said brake shoe but on an arc of lesser diameter than that of the braking surface, a block movable radially with respect to said shaft to which said brake shoe is pivoted, and a cam rotatably mounted on said shaft and exerting its force radially upon said block for positively moving said block and brake shoe both toward and from said braking surface.

8. In a friction brake, a member having a curved braking surface, a pivoted brake shoe having its contact surface formed on the arc of a circle of greater diameter than that of one struck from the pivotal point of said brake shoe but on an arc of lesser diameter than that of the braking surface, a movable block to which said brake shoe is pivoted, springs between said brake shoe and the fixed part of the device and brought into operation when said brake shoe is retracted for causing said brake shoe, when retracted from the braking surface, to be positioned centrally on its pivot out of contact with said surface, and means for positively moving said block and brake shoe toward and from the braking surface.

9. In a friction brake, a member having a curved braking surface, a pivoted brake shoe having its contact surface formed on the arc of a circle of greater diameter than that of one struck from the pivotal point of said brake shoe but on an arc of lesser diameter than that of the braking surface, a movable block to which said brake shoe is pivoted, springs between said brake shoe and the fixed part of the device and coöperating abutments on said brake shoe and the fixed part of the device for causing said brake shoe, when retracted from the braking surface, to be positioned centrally on its pivot out of contact with said surface, and means for positively moving said block and brake shoe toward and from the braking surface.

In testimony whereof, I have hereunto set my hand in the presence of two subscribing witnesses.

WILLIAM C. MARSH.

Witnesses:
J. J. REED,
J. L. HURLBERT.